United States Patent [19]
Hönig et al.

[11] Patent Number: 4,527,422
[45] Date of Patent: Jul. 9, 1985

[54] APPARATUS FOR DETERMINING THE VALUE OF A CYCLICALLY VARYING PARAMETER OF AN INTERNAL COMBUSTION ENGINE

[75] Inventors: Günter Hönig, Ditzingen; Günther Kaiser, Stuttgart; Gerhard Lotterbach, Markgröningen; Udo Zucker, Güglingen, all of Fed. Rep. of Germany

[73] Assignee: Robert Bosch GmbH, Stuttgart, Fed. Rep. of Germany

[21] Appl. No.: 504,525

[22] Filed: Jun. 15, 1983

[30] Foreign Application Priority Data

Jun. 23, 1982 [DE] Fed. Rep. of Germany ....... 3223328

[51] Int. Cl.³ ............................................ G01M 15/00
[52] U.S. Cl. .................................................. 73/117.3
[58] Field of Search ..................... 73/117.3, 117.2, 115, 73/118; 364/551

[56] References Cited

U.S. PATENT DOCUMENTS

3,389,599  6/1968  Beale .................................. 73/115
3,864,963  2/1975  Rivere ................................ 73/115

FOREIGN PATENT DOCUMENTS

275475  10/1970  U.S.S.R. ............................... 73/115
558190   6/1977  U.S.S.R. ............................. 73/117.3
569888  10/1977  U.S.S.R. ............................. 73/117.3

*Primary Examiner*—Jerry W. Myracle
*Attorney, Agent, or Firm*—Frishauf, Holtz, Goodman & Woodward

[57] ABSTRACT

To permit simple computation of control parameters, for example by an engine microcomputer, operating parameters of the engine are signalled by sensing instantaneous operating conditions such as speed, induction air pressure, or the like, preferably at a sensing angle of the crankshaft in advance of top dead center (TDC) position of a reference piston, and the average value is then determined by weighting the sensed instantaneous value to relate it to an average value in a weighting circuit (16). Preferably, the sensed signal is additionally modified in a function generator (15) as a function of then pertaining average conditions of at least one of: speed n; loading L.

19 Claims, 4 Drawing Figures

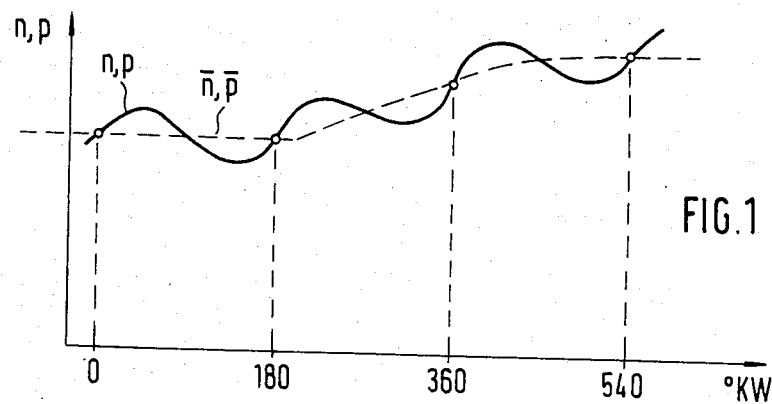
FIG.1
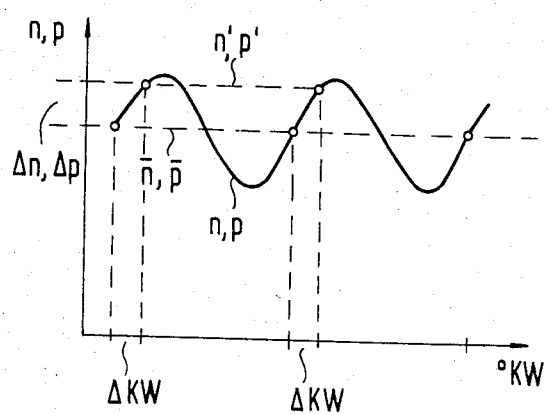
FIG.2
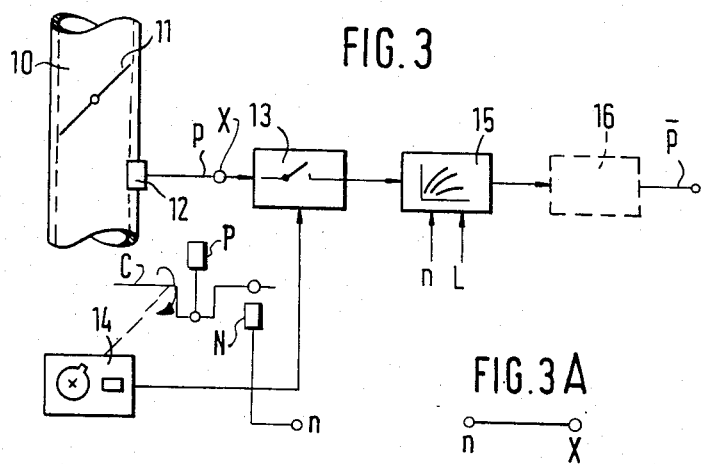
FIG.3
FIG.3A

APPARATUS FOR DETERMINING THE VALUE OF A CYCLICALLY VARYING PARAMETER OF AN INTERNAL COMBUSTION ENGINE

The present invention relates to an apparatus to determine the value of a cyclically or periodically varying parameter of an internal combustion piston engine in which a sensor senses an operating parameter and provides a sensed signal representative thereof at any instant of time, for example speed, induction pipe pressure, mass of air drawn in through the induction pipe, or the like, and more particularly to apparatus providing an output representative of an actual average value of the parameter.

BACKGROUND

Various operating parameters which arise in an internal combustion engine (ICE) such as speed, induction pipe pressure, mass of air sucked into the engine through the induction pipe, and the like, are only quasi-continuous values. Upon detailed examination of such values, it was found that they actually vary in rhythm or synchronism with the strokes of the ICE. Control systems which are to provide control for the engine which are generally appropriate thereto frequently consider an average value of the sensed parameters which corresponds to a median or average of the value with respect to a comparatively long period of time. High-accuracy control systems, however, and particularly control systems which are based on electrically and electronically operating systems, require higher accuracy in sensed parameters. Such systems utilize stored characteristics which, for example, store the relationship of data of various parameters in electronic memories, such as read-only memories (ROMs), to control ignition, fuel injection, and the like. A more accurate system which senses those parameters is thus required.

German Patent Disclosure Document DE-OS No. 30 48 674 describes a measuring system to provide an electrical output signal representative of the mass of air being sucked into the induction pipe to an ICE which has a timing circuit synchronized with crankshaft position of the ICE. The air mass signal is measured at different instants of time which correspond to predetermined angular positions of the crankshaft. The actual quantity of air being introduced to the IEC then is computed by a data processing apparatus from the instantaneous values at the respective measuring instants.

The system is entirely suitable, but requires a highly accurate timing control and provides as an output theoretical measured value. The accuracy is excellent; it is, however, frequently not required to provide such a highly accurate output signal and thus incur the expense of this measuring system.

THE INVENTION

It is an object to provide apparatus which furnishes output signals representative of parameters of an ICE having a periodically varying component, suitable for electronic data processing, which is simple and which can be inexpensively constructed from readily available components.

Briefly, a controlled switch is connected in the output line from a sensor to a signal processing or other suitable output circuit, the controlled switch being controlled to close and provide the respective value at a predetermined position of the crankshaft of the engine.

The output circuit thus receives a reading signal related to a predetermined crankshaft position of the ICE. This predetermined position is selected at a suitable angular position with respect to top-dead-center (TDC) position of a piston, which forms a reference position. The output circuit includes a weighting circuit, and provides an output signal representative of the value of the time-average of the sensed signals applied to the output circuit. The signals derived upon operation of the switch means thus are weighted to be representative of the average value.

In accordance with a preferred embodiment, the sensor output signal is modified by, or calculated, based on a predetermined known relationship of the instantaneous signal—at the respective angular position of the crankshaft—with respect to average value. The relationship of the instantaneous value at that position with respect to average value can be determined once, and stored in a memory which stores characteristic curves relating the instantaneous value at one crankshaft position of the ICE with respect to average value throughout a complete operating cycle of the engine.

The system has the advantage that signals of parameters to be determined will be provided, requiring, however, only few structural components.

In accordance with a preferred embodiment of the invention, the instantaneous value of the parameter is not measured at a zero or TDC position of the crankshaft of the ICE, but, rather, at a position which is offset with respect to the zero position by a predetermined angle, so that the computer can then easily run a program with respect to the zero or a reference or TDC position of the crankshaft, thus substantially simplifying the program of an engine computer or the like.

The system is particularly suitable for measuring induction pipe pressure, and especially effective when a family of curves relating speed or load signals to the induction air pressure are used to modify the sensed output signals in accordance with the then pertaining speed and/or load conditions of the engine.

DRAWINGS

FIG. 1 is a graph showing the variations, with respect to time, of a parameter of the engine, for example speed, induction air pressure, or the like;

FIG. 2 is a further graph of the time variation of a parameter, such as speed or induction air pressure, and referred to in the further description of the invention;

FIG. 3 is a block circuit diagram of the system; and

FIG. 3A is a schematic fragmentary diagram to illustrate a modification.

DETAILED DESCRIPTION

The parameter to be determined, for example speed n, or induction pipe pressure p of an ICE is shown in FIG. 1 at the ordinate; the abscissa represents the angular position of the crankshaft, in degrees. The representation of FIG. 1 is an example for a four-cylinder ICE engine of the Otto motor type.

The solid-line curve of FIG. 1 shows the instantaneous value of the respective parameter which is sensed; the broken line-curve shows the average value. As is clearly apparent, the instantaneous value of speed n and pressure p varies with the working strokes of the ICE, that is, with a component subject to periodic variation based on 180° crankshaft angle, pressure, speed n and pressure p, respectively, increase, to provide the output graph shown in FIG. 1. In order to be able to determine the average value of speed or pressure, respectively, the instantaneous value, in accordance with the first embodiment of the invention, is measured at 0°, 180°, 360° . . . of crankshaft position. The advantage, with respect to measuring systems which are asynchronous, is that the instantaneous parameter measured permits formation of an exact average value for each working stroke or cycle of the ICE.

As can be seen from FIG. 1, the average value of the curves n, p, respectively; over 180°, 360° . . . crankshaft rotation (abscissa) is represented by the broken line $\bar{n}$, $\bar{p}$, which passes through the zero or null cross-overs of the undulating component of curve n, p.

Determination of the measured value is independent of variations or pulsations occurring during the working stroke of the engine, particularly pressure pulsations, and making the measurement only once during each working cycle permits particularly simple determination of the parameter to be sensed, for further processing.

Control systems which use data processing apparatus to control operating elements of an ICE utilize cyclically running programs to determine respective positioned or output values based on received inputs. It is desirable not to interfere with the program by providing excessive input information thereto, for example by increasing the inputs particularly at values of crankshaft positions of the ICE which are close to the TDC position. In accordance with a preferred embodiment of the invention, and referring to FIG. 2, the instantaneous value is not sensed at 0°, 180° . . . angular position of the crankshaft, but rather at an instant which is shifted by an angle $\Delta KW$ with, i.e. °$KW + \Delta KW$ respect to the TDC positions. By carrying out the determination of the instantaneous value at a shifted angular position, the actual sensed values will be, for example, speed n', or pressure p', shifted by the difference values $\Delta n$, $\Delta p$, respectively. Since, however, the variation in the respective parameter sensed during one operating cycle can be predetermined with sufficient accuracy, the shifted value n', p' can be suitably modified or weighted by a predetermined factor in order to then calculate or obtain the desired average value $\bar{n}$, $\bar{p}$, respectively.

As can be seen by comparing FIGS. 1 and 2, the weighting factor in FIG. 1 will be 1, or unity; in FIG. 2, the weighting factor will be $1 + \Delta n$, or $1 + \Delta p$, respectively, for measurement at angular positions °$KW + \Delta KW$ (see FIG. 2).

Referring to FIG. 3: A pressure sensor 12 is located in the induction pipe 10 of an ICE which, also, includes a throttle 11. The pressure sensor 12 provides a signal corresponding to the instantaneous value of the pressure—or, rather, vacuum, in the induction pipe 10. Marker generator 14, coupled with the crankshaft or the camshaft of the ICE, opens and closes. The switch 13, is controlled in dependence on angular position of the crankshaft. In the embodiment of FIG. 3, the instantaneous value p in the induction pipe 10 of the ICE is sensed. Since this instantaneous value p is related to the average value $\bar{p}$ by a non-linear function which, in turn, depends on the speed n and the loading of the ICE, a memory, e.g. a performance graph memory in form of an ROM 15 storing the characteristic relationships of speed n and load L is connected between the sensor 12 and, hence, the switch 13, and an output stage 16. The output stage 16 provides for weighting of the signal according to the relationships stored in memory 15 to compensate for the difference $\Delta n$, $\Delta p$, respectively, from which output the average value $\bar{p}$, or $\bar{n}$, respectively, can be determined. The output-and-weighting stage 16 is utilized when the instantaneous value—as illustrated in FIG. 2—is obtained at a position other than a zero or TDC position of the crankshaft. The output-and-weighting stage 16 and the function memory 15, for example a "read-only memory" (ROM), can be combined as one structural unit.

Of course, other parameters may be sensed. If the system is to be adapted to sense speed, the line is broken at terminal X and the speed signal n is applied—see FIG. 3A.

FIG. 3 also shows, highly schematically, the crankshaft C of an ICE, coupled to a piston P. Speed is sensed by a speed sensor N, providing the output speed signal n, which sensor can be constructed in well known and standard form, for example an inductive pick-up which is located in magnetically interactive relation with a star-wheel or other rotating element of the ICE, for example the starter gear thereof.

Various changes and modifications may be made within the scope of the inventive concept.

The speed and load signals n, L which are applied to the function generator 15 may, for example, be average signals derived from a preceding cycle, for example from the output of circuit 16, which is sufficiently accurate to associate a particular curve relating the operating parameters of the engine to the specific then pertaining conditions, so that the reading signal provided from the reference generator 14 will be modified or weighted with sufficient accuracy for computation in the vehicle computer.

We claim:

1. Apparatus for determining the average value of a parameter having a periodically or cyclically varying parameter component in a piston-type internal combustion engine (ICE) operating in cycles having
    sensing means (12) for sensing an operating parameter of the engine and providing a varying sensed output signal representative of the cyclically varying parameter;
    an output circuit (16);
    means (14) for providing a reading signal;
    and controlled switch means (13) controlled by said reading signal selectively connecting the sensing means (12) to the output circuit (16),
    wherein, in accordance with the invention,
    the means (14) for providing the reading signal is coupled to the crankshaft of the engine for providing, at each cycle of operation of the engine, a single reading signal,
    said signal providing means (14) furnishing said signal at a predetermined angular positon of the crankshaft of the engine with respect to a reference (TDC) position of a reference piston of the engine;
    and the output circuit (16) provides an output signal representative of the value of the time-average of the sensed signals and is coupled to the signal providing means (14).

2. Apparatus according to claim 1, wherein the means (14) for providing the reading signal are coupled to the crankshaft at a position which corresponds to a zero or top dead center position of the crankshaft.

3. Apparatus according to claim 1, wherein the means (14) for providing the reading signal are coupled to the crankshaft of the engine to provide the reading signal at an instant of time which is in advance of the top dead center (TDC) position of the reference piston.

4. Apparatus according to claim 1, wherein the parameter comprises speed n of the engine.

5. Apparatus according to claim 1, wherein the parameter comprises induction air pressure p of the engine.

6. Apparatus according to claim 1, wherein the sensed parameter comprises induction air pressure p of the engine;
and further comprising a function memory (15) storing functions relating at least one of the operating conditions of the engine: speed n; loading L,
to induction air pressure.

7. Apparatus according to claim 1, further including a function memory (15) connected to modify the signal derived from the output circuit (16) in accordance with then pertaining operating conditions of the engine.

8. Apparatus according to claim 7, wherein the then pertaining operating conditions of the engine comprise at least one of: engine speed n; engine loading L.

9. Apparatus according to claim 8, wherein the function memory comprises a read-only memory (ROM) (15) storing a family of curves relating the sensed operating parameter to the then pertaining operating conditions including at least one of: speed; loading of the engine;
and the output circuit (16) comprises a weighting circuit weighting the sensed signal in relation to a theoretical signal at a predetermined angular crankshaft position of a reference piston.

10. Apparatus according to claim 1, wherein the cyclically varying parameter component varies essentially in accordance with a cyclical function;
and the output circuit (16) modifies the sensed output signal by a weighting factor relating the sensed output signal at the respective angular position of the sensing means to the value of the signal when the cyclical function representing the cyclically varying parameter component goes through null or zero.

11. Apparatus according to claim 1, wherein the cyclically varying parameter component varies essentially in accordance with a cyclical function;
and wherein the reading signal providing means (14) is coupled to the engine to provide the reading signal at the time when the cyclical function representing the cyclically varying parameter component goes through null or zero.

12. Apparatus according to claim 11, wherein said cyclically varying function is a sine wave function.

13. Method of deriving a signal representative of an average value of an operating parameter of a piston-type internal combustion engine (ICE), which parameter includes a cyclically varying component, comprising the steps of
determining the value of the signal with respect to the time when the cyclically varying component goes through zero.

14. Method according to claim 13, wherein the value of the cyclically varying component is determined at the time the cyclically varying component goes through zero, to thereby directly obtain a signal representing the average value of the parameter.

15. Method according to claim 13, including the steps of
storing a representation of the value of the cyclically varying component throughout a cycle;
determining the value of the signal at a predetermined time after the component goes through zero;
and modifying the signal in accordance with the stored value by weighting the signal derived at said predetermined time by the difference between the stored value at that time and the value the signal should have when the cyclically varying component goes through zero.

16. Method according to claim 13, wherein the step of deriving the signal representative of the average value comprises
continuously measuring the value of the parameter during at least a portion of the cycle;
and determining the measured value at the predetermined time instant related to the time when the component goes through zero.

17. Method according to claim 16, wherein the value of the cyclically varying component is determined at the time the cyclically varying component goes through zero, to thereby directly obtain a signal representing the average value of the parameter.

18. Method according to claim 16, including the steps of
storing a representation of the value of the cyclically varying component throughout a cycle;
determining the value of the signal at a predetermined time after the component goes through zero;
and modifying the signal in accordance with the stored value by weighting the signal derived at said predetermined time by the difference between the stored value at that time and the value the signal should have when the cyclically varying component goes through zero.

19. Method according to claim 16, wherein said cyclically varying component varies in accordance with a sine function.

* * * * *